INVENTOR.
JOHN B. CHATTEN
BY
Nelson E. Kimmelman
ATTORNEY

INVENTOR.
JOHN B. CHATTEN
BY
Nelson E. Kimmelman
ATTORNEY

INVENTOR.
JOHN B. CHATTEN
BY
Nelson E. Kimmelman
ATTORNEY

INVENTOR.
JOHN B. CHATTEN
BY
Nelson E. Kimmelman
ATTORNEY

June 7, 1966 J. B. CHATTEN 3,255,305

SYSTEM FOR MODIFYING SELECTED COLORS IN ADDITIVE COLOR REPRODUCING SIGNAL PROCESSING SYSTEM

Original Filed June 12, 1958

5 Sheets-Sheet 5

INVENTOR.
JOHN B. CHATTEN
BY
Nelson E. Kimmelman
ATTORNEY

United States Patent Office 3,255,305
Patented June 7, 1966

3,255,305
SYSTEM FOR MODIFYING SELECTED COLORS IN ADDITIVE COLOR REPRODUCING SIGNAL PROCESSING SYSTEM

John B. Chatten, Philadelphia, Pa., assignor to Philco Corporation, Philadelphia, Pa., a corporation of Delaware Continuation of application Ser. No. 741,617, June 12, 1958. This application Aug. 5, 1963, Ser. No. 303,202
4 Claims. (Cl. 178—5.4)

This invention relates to television and in particular to systems for improving or modifying the rendition of colors of images produced in color television systems. This application is a continuation of my copending application Ser. No. 741,617, filed June 12, 1958 and now abandoned.

Systems having the aforementioned characteristics are useful in color television systems, for example, in which the physical phenomenon of interest is the coloration of each element of the televised scene. It is well known that the color of such an element can be considered to be due to the simultaneous presence therein of three primary colors (e.g. red, green and blue) having respective intensities. With this in mind it has been the practice to provide camera equipment at the color television transmitter which scans the scene to be televised in the usual manner, and which produces three separate signals whose respective amplitudes are representative at any given time of the intensities of the three primary color components of the scanned element of the scene.

Signals so derived are transmitted in accordance with established techniques and standards. When received by appropriate television receiving apparatus the signals are used to create color images of the scene televised. It often happens, however, that because of factors associated with the scene televised or with the transmitter the colors of the images produced do not conform to desired criteria as to some or all of their characteristics, i.e., hue, brightness, or saturation. For example, if the scene televised is obtained from colored photographic film, the fidelity of certain colors in the film may be degraded because of the limitations of the dyes used in the film. Also, it is well known that the theoretical range of colors reproduced by available photographic techniques is more limited than that of color television systems in which standard U.S. color television broadcast signals are televised and received. It is often desirable, therefore, to "touch-up" or "mask" the signals to be televised so that when they are received and are applied to a display device the images produced in response thereto will have the desired color values. In certain cases the desired values make the colors of the images more natural; in others, the desired values are such that images which are the most pleasing to observers are produced even though the colors therein are not reproduced with the greatest fidelity to the colors of the original scene.

Another important reason for modifying the signals to be televised is to make "flesh-tones," i.e., the color of human skin, appear more natural since it is very difficult in practice to produce signals which are utilized by a receiver to reproduce flesh tones faithfully. Improper rendition of flesh tones is extremely noticeable and objectionable, and systems and apparatus for assisting in improving the reproduction thereof are therefore very desirable.

Still another use for modifying the transmitted signals is for special effects, i.e., for causing certain elements in the reproduced colored image to have greater brightness, or to change from one color to another at will, or to be reproduced only in terms of black or white, to mention just a few possible special effects. Another important special effect is concerned with the enhancement of the reproduction of a sponsor's product so that it is reproduced with a very high degree of color fidelity so as to enable the public to identify it easily in the market place.

Systems are known which are designed to alter signals for producing color television images so as to improve the reproduction of colored photographic slides and films. This apparatus combines desired proportions of the three color representative voltage waves produced by the pickup device so as to correct for degradations in the colors of the transparencies which are largely due to deficiences in the dyes used in the photographic emulsions. In these systems, if the characteristics of the dyes in the film are known, or can be observed on a color television picture monitor, an engineer can adjust or modify one or more of the signals which correspond to the colors of the respective dyes in the film so as to obtain compensated signals representative of the primaries used. However, when the red representative signal, for example, is modified the reproduction of all elements of the televised scene, whose colors are combinations which include red and other colors as, for example, yellow (red+green), magenta (red+blue) and so forth, will be affected by the modification as will all shades of red alone. Also when it is desired to modify a color which is comprised of a certain *combination* of primary colors, i.e., magenta, the signals representative of both primary colors red and blue may be modified so that all elements which contain blue or red will necessarily also be affected.

There is often a need as mentioned above, for modifying only certain colors or combinations of colors present in elements of the reproduced image, i.e., in elements containing flesh-tones which are comprised mainly of yellow and orange (which themselves are mixtures of red and green) without modifying other elements of the image which may also contain some red or green coloration.

It is well-known that the color of a given element of the reproduced image corresponds to a certain combination of predetermined amounts of the signals representative of the primary colors which are produced by the pickup device. It would therefore be highly useful, for the reasons stated above, to modify the color reproduction of the selected elements of the televised scene by modifying the signals to be transmitted only when they correspond to the color or range of colors of the elements whose characteristics are to be modified.

The invention is also useful in systems other than television systems in which a plurality of signals exist which respectively represent the values of different characteristics of given physical phenomena. For example, the invention is useful in radar systems or the like in which electrical signals are obtained indicating the instantaneous position of an aircraft which is being tracked. The present invention is useful for example, in detecting when the position-indicating signals respectively have simultaneous amplitude values corresponding to the position of the aircraft in a "prohibited" area and for actuating anti-aircraft devices trained on the prohibited area.

Accordingly, it is an object of the invention to provide systems for detecting when a plurality of signals simultaneously have respective predetermined amplitude values.

Another object of the invention is to provide, in a system wherein a plurality of input signals represent by their respective magnitudes values of different characteristics of given physical phenomena, apparatus for producing output signals indicative of the simultaneous attainment by said input signals of predetermined respective magnitudes.

Another object of the invention is to provide systems for actuating a utilization circuit when a plurality of signals simultaneously attain respective predetermined amplitude values.

It is a further object of the invention to provide systems for modifying selected ones of a plurality of signals whenever they simultaneously have respective predetermined amplitude values.

Still another object of the invention is to provide systems for altering selected characteristics of selected elements of a televised scene without affecting the characteristics of other elements thereof.

It is still another object of the invention to provide, in a color television system wherein three separate input signals represent, by their respective instantaneous magnitudes, the intensities of the three primary color components of the contemporaneously scanned element of a televised scene, means for producing an output signal only when the said element has a given color or has one of a given range of colors.

These and other objects of the invention which will appear are achieved by apparatus whose construction is based on the realization that a given phenomenon such as, for example, a particular coloration of a televised picture element, is uniquely defined by the magnitudes of three signals which are respectively representative of the intensities of three primary color components in terms of which the actual color of the element can be resolved.

In accordance with the invention the signals which uniquely define the phenomenon in question are supplied to a device which is responsive to these signals to produce a distinctive output signal when and only when all of the input signals simultaneously have certain preselected magnitudes, or fall within a preselected range of magnitudes. The output signal is used to actuate a particular utilization circuit. In a preferred form of the invention, the utilization circuit is designed to modify one or more of the input signals, prior to their application to other signal utilization devices.

More particularly, when used in color television applications, the device which detects when input color representative signals simultaneously have certain preselected magnitudes preferably includes a matrix for combining predetermined amounts of the input signals with the desired polarities so as to produce a composite signal wave. This composite wave is so constituted that when it is of one polarity it indicates that the element being scanned has a color that one desires to modify; when it is of the opposite polarity it indicates that the color of the element being scanned is not to be modified. Apparatus is also provided for extracting, from the composite wave, portions of the desired polarity for actuating a utilization circuit thereby. In a preferred form of the invention the utilization circuit may include means for combining the extracted portions of the composite wave with certain ones of the input signals so that the input signals, as modified, will produce images in which selected elements will display desired color characteristics.

In another form of the invention the color representative input signals are derived from a subcarrier which is modulated in different phases by color difference signals. In this form the input signals are applied to one or more matrixes which produce a composite signal wave from which certain amplitude portions are extracted. These extracted portions are used to actuate a circuit which combines with the modulated subcarrier adjustable amounts of a sine wave having the same frequency as the subcarrier and a desired phase relation thereto, thereby causing the amplitude and/or phase of the modulated subcarrier to be altered whenever the input signals correspond to elements having selected colors. By altering the amplitude and/or phase of the modulated subcarrier the characteristics of selected elements of the image produced in response thereto are also altered in a desired fashion.

In another form of the invention the antenna of a radar system is caused to "track" moving objects. As it tracks, signals representative of the azimuth, elevation and range of the object are generated by electronic and electro-mechanical means. These signals are applied to a matrix which is so adjusted that when the signals applied thereto correspond to a point or points in a predetermined volume of space to be defended, an output signal is produced which actuates appropriate counter-measures such as anti-aircraft devices which are so set that they will destroy the moving object in or near the said space.

FIGURE 1 is a block diagram of one form of my invention;

FIGURES 2*a* and 2*b* are block and circuit diagrams of several of the components of the system shown in FIG. 1;

FIGURE 3*a* is a schematic representation of an illustrative televised scene which is scanned to produce signals that may be modified in accordance with my invention;

FIGURE 3*b* is the waveform of signals produced by a single scan of the illustrative scene shown in FIG. 3*a*;

Figure 1:
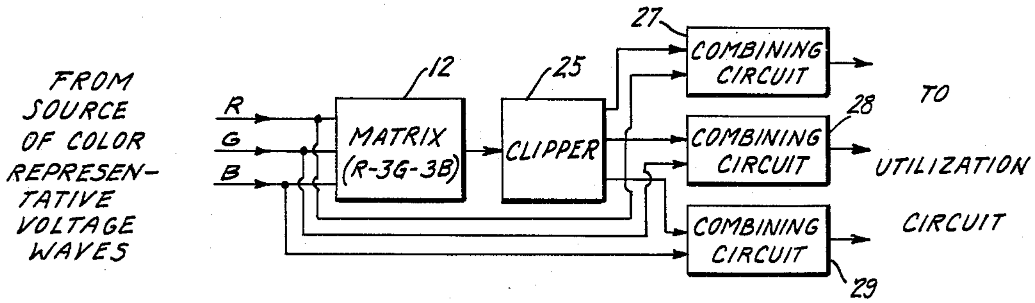

Referring to FIGURE 1 the system shown therein includes a matrix unit 12 to which input signals from a source (not shown) of color representative voltage waves are supplied. These waves may, for example, represent the red, green, and blue colored components respectively of the scene televised. They may be obtained from a color television camera, for example, or from a flying-spot scanner which is scanning color film. Assume that an operator notices, by a comparison of the image on the picture monitor and the actual scene televised, that the red and slightly desaturated red-colored elements of the scene, as reproduced, are somewhat lacking in their red content. However, other elements of the scene which contain red, i.e., magenta (blue+red) and yellow (red+green), are being reproduced faithfully. The operator, therefore, desires to modify the color representative voltage waves to correct for the observed deficiencies in reproduction by increasing the amplitude of the red representative signal only when the input signals correspond to the scanning of pure and slightly desaturated red-color elements.

In order to detect when the input signals correspond to pure and slightly desaturated reds a matrix unit 12 is provided.

Figure 2A:
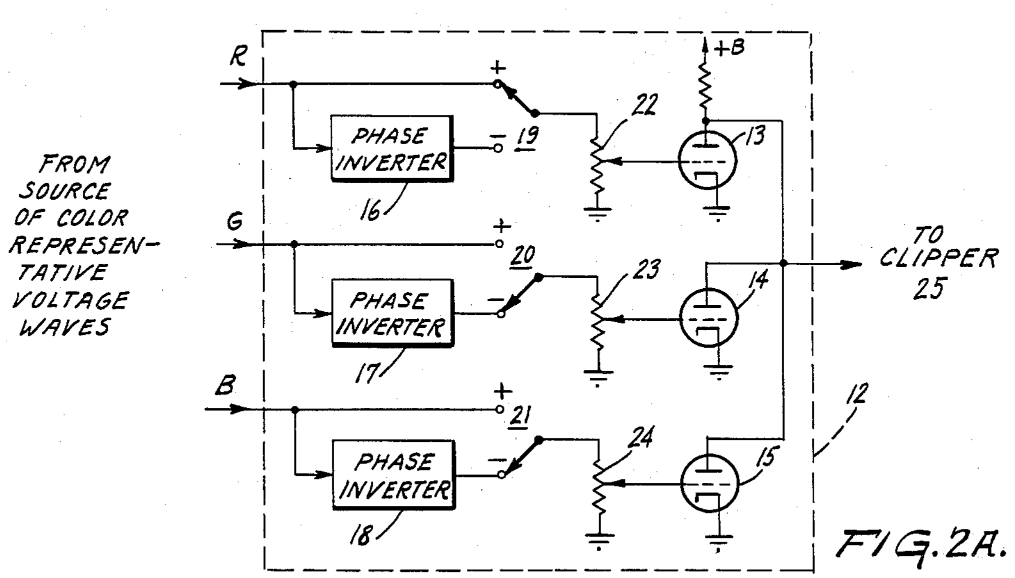

The matrix unit 12, to be more fully described hereinafter with reference to FIG. 2*a*, is constructed so as to produce a single output wave in response to the color representative voltage waves applied thereto. When this output wave is of one polarity it indicates that the element of the scene being scanned by the pickup device is of a pure or slightly desaturated red color whose reproduction is deficient and it is therefore desired to modify it. On the other hand when the output wave of matrix 12 is of the other polarity it indicates that the color of the element being scanned is not to be modified.

In the assumed case it will be shown below that if the matrix unit 12 is so adjusted that it combines predetermined amounts of the input signals applied thereto according to the left side of the following equation:

$$R-3B-3G=V \quad (1)$$

where R, B and G are the instantaneous values of the color representative voltage waves from the pickup device and V is the output signal of the matrix unit 12, the output signal V will be positive when the input signals represent pure and slightly desaturated reds, and will be negative when it represents other colors.

FIGURE 2*a* is the ciruit of a matrix unit which may be used to produce a V signal. It consists of three amplifiers 13, 14 and 15 to which the input red, green and blue representative voltage waves are respectively applied through switches 19, 20 and 21, and rheostats 22, 23 and 24 respectively. Phase inverters 16, 17, and 18 are interposed between the source of the waves and the respective switches. The phase inverters may comprise unity gain amplifiers, for example. All of the amplifiers 13, 14 and 15 have a common output circuit.

To conform to Equation 1, the arms of switches 19, 20 and 21 are positioned on their positive, negative, and negative contacts respectively for obtaining the proper polarities of the input signals to be combined, and the movable arms on rheostats 22, 23 and 24 are so adjusted that three amplitude units of each of the input green and blue representative input waves are applied to their respective amplifiers 14 and 15 whereas one amplitude unit of the red representative voltage wave is applied to its amplifier 13.

It should be appreciated that the circuit of FIG. 2*a* is only presented as a typical circuit for combining the input signals in the desired fashion so as to produce the single output wave whose polarity indicates whether the color being scanned is to be modified or not to be modified. Other types of matrix units such as those described in the January 1954 issue of "Proceedings of the I.R.E." at page 201, et. seq., may alternatively be used so long as they produce a single output wave having values corresponding to the values of V in Equation 1.

Returning to FIG. 1, the single output wave of matrix 12 is applied to a clipper 25 which may be of any conventional type. The clipper 25 extracts all portions of the output wave of the matrix 12 which are positive, these positive portions indicating that the element of the scene being scanned is either pure red or a slightly desaturated red in color. A simple form of a clipper that may be used to accomplish this purpose consists of a triode whose grid is biased so far negative that only those portions of the output wave of the matrix which are of the desired magnitude and polarity cause the triode to conduct.

The output wave of clipper 25 is supplied to one of the two input circuits of each of three conventional combining circuits 27, 28 and 29. To the others of the two input circuits the respective input color representative voltage waves from the source thereof are applied. In the combining circuits, adjustable amounts of the output wave of clipper 25 are combined with adjustable amounts of a selected one or ones of the input color representative waves thereby to modify the latter so that they will produce an image in which the elements having the selected colors are reproduced with the desired characteristics.

All of the combining circuits 27, 28, and 29 may be of the same conventional design. Each of them may comprise, as shown in FIG. 2*b* which represents a circuit 27, a circuit consisting of two tubes having a common output circuit and two independent input circuits, the latter containing provision for adjusting the amplitude of the respective signals applied thereto.

In the case assumed there was an insufficient amount of red in the elements of the image, as observed on the picture monitor, which were to be pure or slightly pinkish-red in color. Therefore, it is desired to augment the amplitude of the red representative wave when the signals transmitted correspond to the pure red or slightly pinkish-red elements. Toward this end the combining circuit 27 is so adjusted that some of the output signal of the clipper 25 is added to the unmodified red representative color wave from the source thereof.

Figure 2B:
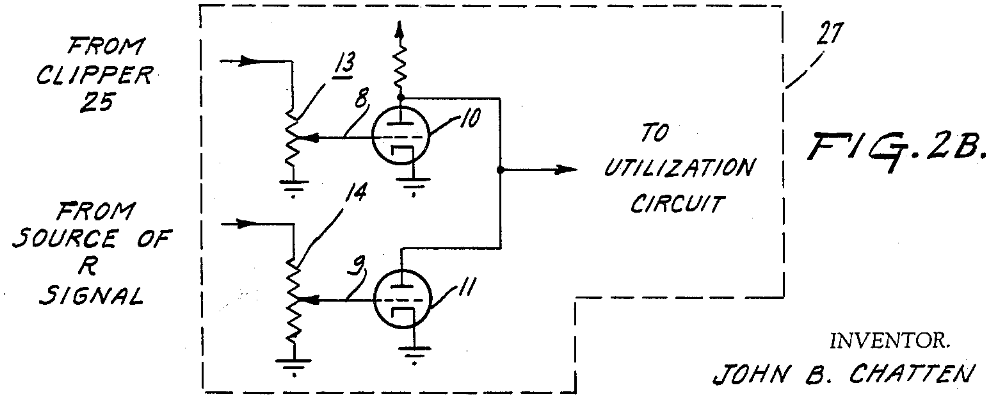

This is accomplished, as shown in FIG. 2*b*, by setting the arm 8 of variable resistor 13 at the point where the desired amount of the voltage from clipper 25 is applied to tube 10 where it is amplified and applied to the output utilization circuit. The R signal is applied via variable resistor 14 and the movable arm 9 to the tube 11 whose output circuit is common with that of tube 10.

On the other hand, since those elements of the image which contain some blue and/or green are satisfactorily reproduced, the combining circuits 28 and 29, in which the blue and green representative voltage waves can respectively be modified, are so adjusted that no part of the output signal wave of clipper 25 is added to the unmodified green and blue representative voltage waves from the sources thereof. Thus in those combining circuits, the movable arms corresponding to the arm 8 (FIG. 2*b*) would be set at ground and only the G and B signals would appear in the outputs of the tubes corresponding to tube 11.

In summary, the combining circuits 27, 28 and 29 produce three output waves, unmodified blue and green representative waves and a modified red representative wave whose amplitude is increased when pure and slightly desaturated red-colored elements are scanned by the pickup device. The modified output waves of the combining circuit 27, in combination with the other two unmodified output waves from the circuits 28 and 29, therefore produce images in which the corresponding reddish elements will appear to be more saturated. In other cases, of course, the output wave of the clipper may also be added to others of the color representative voltage waves in the combining circuits 28 and 29 depending on the characteristics which the selected elements are to possess.

The output waves of the combining circuits are then fed to an appropriate utilization circuit (not shown) which may be for example, the conventional circuits of a color television transmitter for processing the color representative waves of the pickup device. These conventional circuits (not shown) may include gamma-correction circuits (i.e., circuits for predistorting the color representative waves applied thereto so as to compensate for the non-linear relation between the light output of a typical cathode ray image reproducing tube and its electrical input), matrix units for forming the luminance of "Y" signal and the so-called "I" and "Q" chrominance signals in accordance with standards established by the Federal Communications Commission for United States color television broadcast signal transmission. These conventional transmitter circuits may also include modulating circuits for modulating quadrature phases of the prescribed subcarrier by the respective "I" and "Q" chrominance signals, circuits for combining the modulated subcarrier waves with the luminance signal, ciruits for inserting deflection synchronizing signals and for inserting the color synchronizing "burst" of a wave having the same frequency as the prescribed subcarrier, and finally circuits for modulating the main radio frequency carrier with the composite signal.

It should be noted that, as a practical matter, it may be desired to correct the color representative signals *after* they have already been gamma-corrected rather than *before* they are gamma-corrected as is the case in the apparatus schematically shown in FIG. 1. This does not require any substantial changes in the apparatus as pictured in FIG. 1 except that the equation according to which the matrix is adjusted will differ somewhat. It will also be necessary to reset the clipping level of the clipper which follows the matrix and to adjust the variable portions of the combining circuits to account for the gamma-correction. The apparatus is otherwise identical to the apparatus shown schematically in FIG. 1 and operates in substantially the same way.

Of course it should be appreciated that the utilization circuit may be of other forms as, for example, a color television picture monitor, or receivers both for home-viewing and for closed circuit or other non-broadcast use.

Figures 3A, 3B:
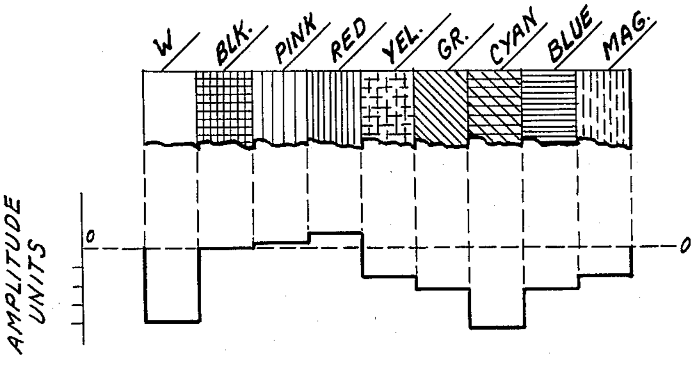
Figure 4:
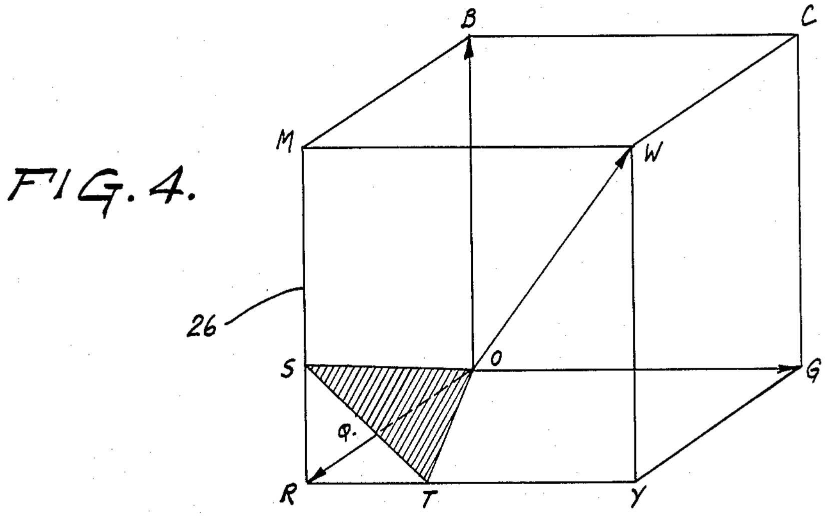
FIGURE 4 illustrates the colorimetric analog known as the "unit color cube" in which all colors may be plotted.

The operation of the apparatus of FIG. 1 will now be explained with the help of FIGURES 3*a*, 3*b* and 4. In connection with FIG. 1 it was assumed, for purposes of explanation, that the characteristics of the elements of the image reproduced on the color picture monitor which were a pure or slightly desaturated red (i.e., a slightly pinkish red), did not conform to desired specifications, whereas the other elements thereof which contained red in different other combinations were being reproduced satisfactorily. It will be further assumed that the scene televised is a bar chart containing contiguous bars of white, black, slightly pinkish-red, pure red, yellow, green, cyan, blue and magenta as shown in FIG. 3*a*. It is possible to plot each of the colors of the bar chart, for analytical purposes, in terms of their content of the three additive primaries red, green and blue in the so-called unit "color cube" 26 shown in FIG. 4." The color cube is an analog descriptive of all colors which has been found very useful by researchers in colorimetry. The volume enclosed by the color cube of FIG. 4 in which all colors may be plotted is called "color space."

The color cube has three mutually orthogonal ordinates OR, OG and OB which respectively are the red, green and blue representative vectors. All other colors may be specified by reference thereto. For example, magentas of all brightnesses, which consist of various combinations of red and blue, would be located (i.e., could be plotted) near a straight line joining points O and M. Similarly all yellows, which are combinations of red and green would be near a line joining points O and Y, whereras all cyans, that is, combinations of blues and greens, would lie near a line adjoining points O and C. Peak white, which is a combination of maximum amounts of red, green and blue is shown at the point W through which the line OW passes. Less intense whites or gray shades will be located at various points along the line OW. Black, or the absence of any color, is located at the origin O. The brightness of any color plotted in the color cube depends on its distance from the origin O, the greater the distance of the plot of a given color therefrom the greater is the brightness of that color.

In order to comprehend the operation of matrix unit 12 more fully it would be well to locate the red and slightly desaturated red colored elements of the reproduced image (i.e., elements whose colors are to be modified) in the color space of the color cube. If a plane SOT is drawn as shown in FIG. 4, which intersects the origin O and the faces MBOR and ROGY of the cube 26 one can say that all pure reds and slightly desaturated reds will be located within the tetrahedron bounded by the planes SOT, OTR, ROS and SRT.

In order to detect when the color representative voltage waves applied to the input of matrix unit 12 corresponds to colors which can be plotted in the said tetrahedron, the matrix unit 12 is so constructed that it modifies the signals applied to it so that its output wave will be of a given polarity say, positive, when the input waves correspond to pure and slightly pinkish reds, and negative when they correspond to other colors. It has previously been stated without proof that if the unit 12 combines the signals applied to it according to the expression on the lefthand side of Equation 1, its output wave V will be positive when the color of the element being scanned is pure or slightly desaturated red. In order to understand more completely why the matrix unit 12 is adjusted so that it will combine the color representative signals applied to it in accordance with the lefthand side of Equation 1, the derivation of the latter equation will now be set forth.

Equation 1 is derived by first deriving the equation of the plane SOT. It is possible to derive the equation for plane SOT by using the general equation for any plane passing through the origin O which is $$aR+bG+cB=0 \qquad (2)$$

where R, G and B are variables and $a$, $b$, and $c$ are the constants. As shown in FIG. 1 the three points S, O and T define the plane SOT. Each of htese points has the following coordinates:

| | R | G | B |
|---|---|---|---|
| S | 1 | 0 | ⅓ |
| O | 0 | 0 | 0 |
| T | 1 | ⅓ | 0 |

Substituting the coordinates of point S in Equation 2 yields $$a+\frac{c}{3}=0, \text{ or } c=-3a \qquad (3)$$

Similarly, by substituting the coordinates of point T in Equation 2 one obtains $$a+\frac{b}{3}=0, \text{ or } b=-3a \qquad (4)$$

The values of $c$ and $b$ obtained in Equations 3 and 4 are substituted in Equation 2

$$aR+[-3a]G+[-3a]B=0 \qquad (5)$$

Dividing Equation 5 by $a$ gives us the desired equation for plane SOT $$R-3G-3B=0 \qquad (6)$$

Whenever the signals applied to the matrix 12 represent colors which can be plotted on the plane SOT the matrix will not produce any output signal. However, whenever the signals applied thereto correspond to colors in the color cube which are not located on the plane SOT, the matrix will produce either a positive or negative output signal depending upon whether the color scanned is located (i.e., can be plotted) on the left or right side of the plane SOT.

FIGURES 3*a* and 3*b* illustrate the operation of the unit 12 and the nature of its output signal when a test pattern containing a number of contiguous color bars is the scene televised. When the white bar is scanned by the pickup device, the signals applied to the matrix unit 12 consist of one unit each of the red, green and blue represents signals. Substituting a value of one for R, G and B in Equation 1 produces a value of V which is negative and which has an amplitude of 5 units (i.e., 1 −3 −3). When the black bar is scanned there will be no signals applied to the matrix and therefore no signals in the output of the latter. Suppose that the color of the next bar, pinksh red, can be plotted so that it falls at point Q which is in the plane SRT. Its coordinates in the cube will be approximately $R=1$, $G=0.15$, $B=0.15$. The relative amplitude values of the corresponding color representative signals will be the same and when they are modified by the matrix 12 the output signal, V will have an amplitude value of 0.1. Accordingly, the matrix output signal, whose waveform is shown in FIG. 3*b*, will be positive by just a small amount as shown therein.

The next bar is a pure red having maximum brightness so the signals applied to the matrix will consist solely of one amplitude unit of red and none of blue or green. Substituting in Equation 1 gives a positive output signal of one unit as shown.

In a similar manner the amplitude and polarity of the output signal V of the matrix 12 for the other bars of the chart may also be calculated to produce the following results:

| Bar | Color Units | | | Matrix Output Signal (in amplitude units) |
|---|---|---|---|---|
| | R | G | B | |
| Yellow | 1 | 1 | 0 | −2 |
| Green | 0 | 1 | 0 | −3 |
| Cyan | 0 | 1 | 1 | −6 |
| Blue | 0 | 0 | 1 | −3 |
| Magenta | 1 | 0 | 1 | −2 |

On inspection of the waveform of FIG. 3*b* it will be noted that the scanning of the pinkish red bar produces a very small amplitude positive signal, the scanning of the pure red bar produces a large positive signal, and the scanning of the cyan bar produces the largest negative signal. It may be shown that the amplitude of the output signal of the matrix unit denotes the distance from the plane SOT of the plot of the color being scanned measured along a straight line which is perpendicular to the latter plane. Thus since the cyan of the bar chart is composed of a unit of green and a unit of blue it is plotted at point C, and since ploint C is farthest from plane SOT the output signal corresponding to cyan has the largest amplitude. Conversely, the output signal corresponding to the pinkish red of the bar chart which is plotted as point Q has the smallest amplitude (other than zero) since it is closest to the plane SOT.

Since the waveform of FIG. 3*a* reveals that a positive signal is produced by matrix unit 12 only when pure and slightly desaturated red elements are scanned, it is seen that if the clipping level of clipper 25 is so set that the clipper transmits only those signals which extend above the zero level the clipper will produce an output signal only when the colors to be modified are being scanned. Therefore, only when the selected colors are scanned will the amplitude of the red representative voltage wave be increased by adding a desired amount of the output signal of clipper 25 to it in the combining circuit 27 thereby increasing the saturation of the predominantly red color elements of the reproduced image without affecting the reproduction of colors of any other elements thereof.

The invention has been explained so far in terms of a very simple example in which the colors to be modified were those consisting predominantly of a single primary color with very small amounts of the other two primaries mixed in. In the case illustrated by FIGS. 1–4 it was only necessary to employ one matrix unit since the colors to be modified could be plotted in a volume of the color space of the color cube which was bounded by three faces of the cube. Thus is was necessary to derive the equation for only one plane, i.e., the plane SOT and adjust the matrix unit so as to produce signals having values corresponding to V.

Often, however, the elements of the reproduced image which are to be modified, have colors which are not located principally near one of the primary colors. For example, the elements of the image whose observed reproduction is deficient might contain those yellows, reds, and blues that could be plotted in the pentahedron shown in FIGURE 5, i.e., the pentahedron bounded by the planes SWO, WOT, TOS (which all pass through the origin), LJDK and MWYR. In this case it would be necessary to derive equations for planes SWO, WOT, TOS and LJDK but not for plane MWYR since it is a face of the cube. It should be noted that the plane LJDK is more remote from the reader than the plane SWT. Also the plane LJDK is parallel to plane MWYR and is located one third the distance from O to R.

The equations in this case for the planes which enclose the space in which the colors to be modified may be plotted can be derived in a fashion similar to the derivation of the equation SOT as explained previously. It may be shown that the equation for the plane SOW is as follows:

$$R+2G-3B=0 \qquad (7)$$

The equation for the plane WOT is:

$$R-3G+2B=0 \qquad (8)$$

The equation for the plane LJDK (and of the part XZP thereof) is:

$$R=0.3 \qquad (9)$$

The equation for the plane SOT has previously been given in Equation 6 as $R-3G-3B=0$. However, since it is now desired to detect when the R, G and B signals correspond to colors on the *right* rather than the left side of the plane by means of a matrix unit which produces a positively polarized output signal corresponding thereto, the equation for SOT is changed in signal as follows:

$$-R+3G+3B=0 \qquad (10)$$

No equation is required for the plane SWT since it is a part of the cube face MWYR.

Figure 5:
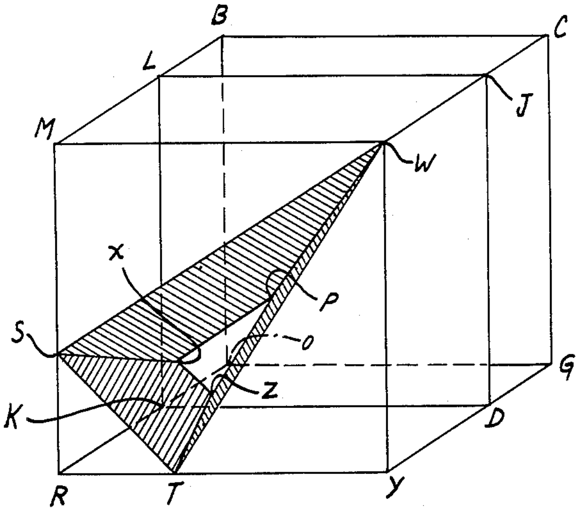
FIGURE 5 illustrates the location of certain colors in the "unit cube," these colors being those which it desired to modify in accordance with another form of my invention.
Figure 6:
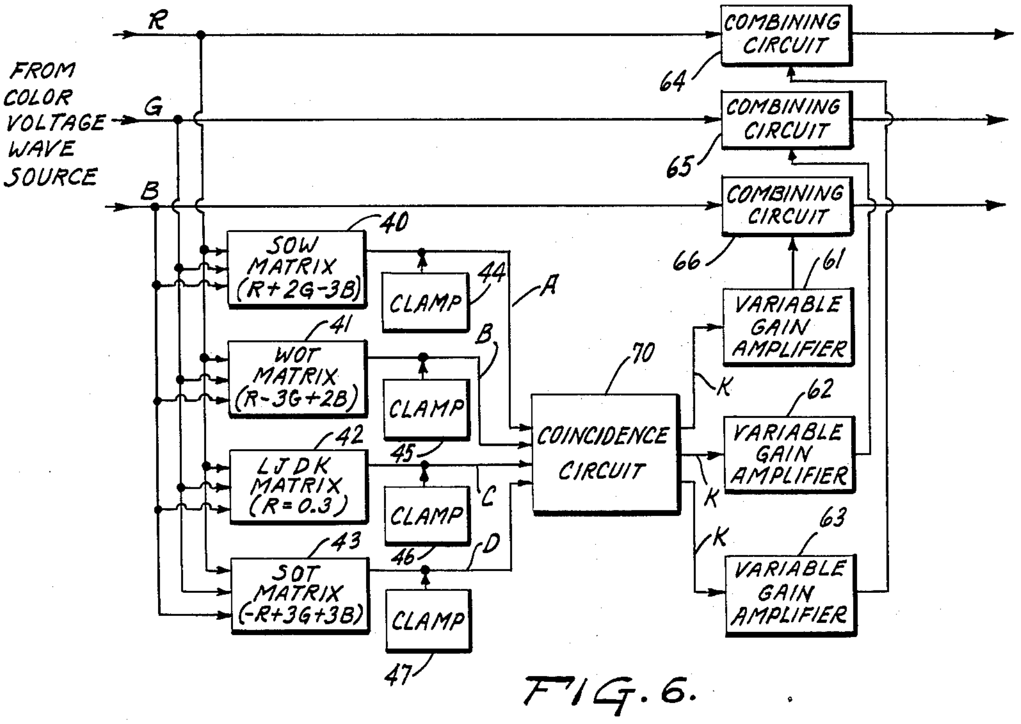
FIGURE 6 is a block diagram of a system for modifying certain colors in another form of my invention.

FIG. 6 is a block diagram of apparatus for detecting when the instantaneous values of the color representative signals are such as to correspond to the colors which may be plotted within the aforesaid pentahedron shown in FIG. 5. In order to derive voltage waves corresponding to the left-hand sides of Equations 7, 8, 9, and 10 respectively, separate matrix units 40, 41, 42 and 43 are provided. All of these units may be of the same general construction as the one shown in FIG. 2, and they produce respective output signals consisting of certain predetermined amounts of the input R, G, and B-representative waves which have been combined in the desired polarities. These respective matrix unit output signals will be of positive polarity when the input R, G and B waves correspond to colors which are on a predetermined side of each of the planes. In other words if the R, G and B signals applied to the matrix unit 40 correspond to colors which are plotted in the color space of the color cube *below* the plane SOW, the output signal of the matrix will be positive. If the R, G and B signals applied thereto correspond to colors which can be plotted *on* the plane SOW, the output signal will be zero. If the R, G and B signals applied to the matrix correspond to colors which can be plotted *above* the plane SOW the output signal will be negative. Similarly, as stated previously, when the R, G and B signals applied to matrix unit 43 correspond to colors which can be plotted to the left, or on, or to the right right of plane SOT, the output signals of matrix 43 will accordingly be negative, zero and positive. The output signals of matrixes 41 and 42 will also be positive when the R, G and B signals applied thereto correspond to colors that can be plotted within the pentahedron of FIG. 5.

The output waves of the matrixes 40, 41, 42 and 43 are respectively clamped at a reference potential level by the conventional clamping circuits 44, 45, 46 and 47 so that they occupy the same amplitude ranges for given values of the input R, G and B signals. The reference level may be the blanking level established by a pickup device such as a color television camera or a flying spot scanner as the case may be. Preferably, the clamps are keyed, that is to say, they are made operative only during the blanking interval in response to the application thereto of appropriate pulses. A full description of such clamps is contained in "Elements of Television Systems," by G. E. Anner (1st edition, Prentice-Hall, 1953) beginning at page 507. This clamping also assists in performing a subsequent clipping operation to be described later. The clamped output waves are then applied to the coincidence circuit 70 which will produce an output signal only when all four of the clamped waves are positive (i.e., when R, G and B correspond to colors to be modified).

Figure 7:
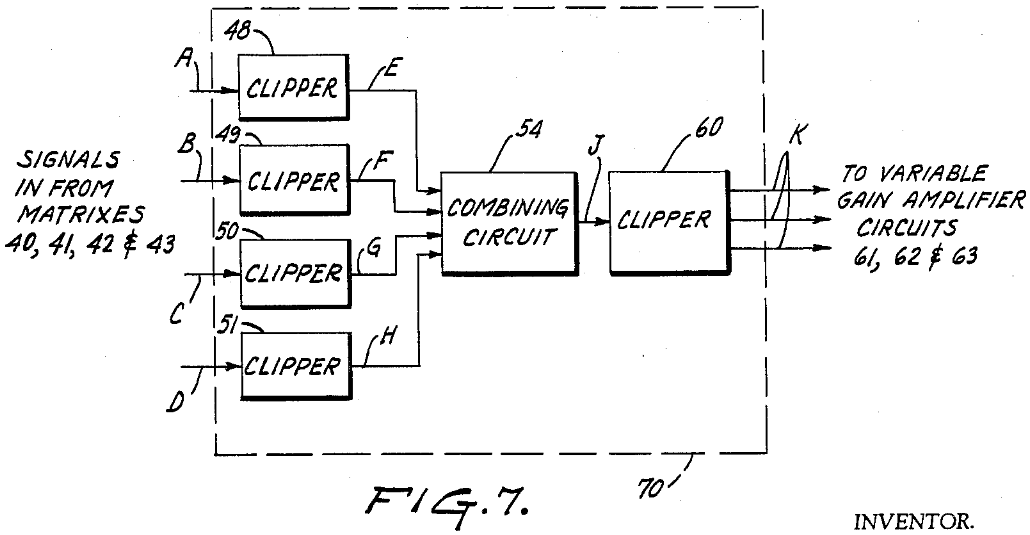
FIGURE 7 is a block diagram of elements which comprise one of the components included in the system illustrated in FIG. 6.
Figure 8:
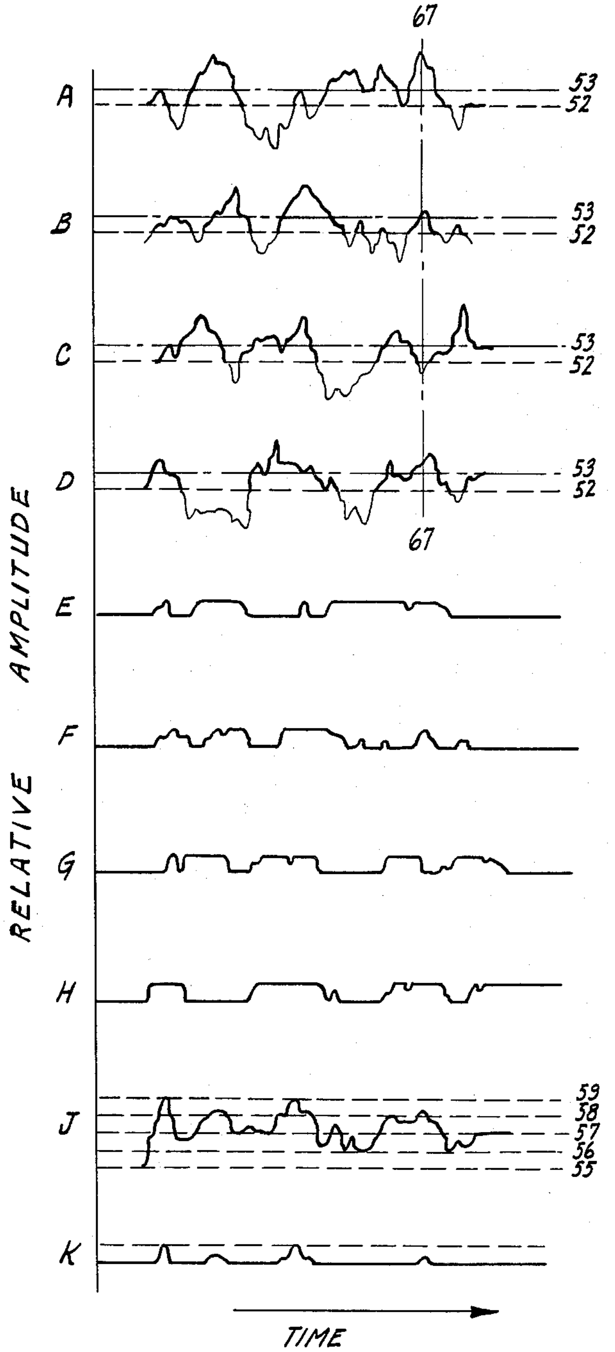
FIGURE 8 shows a group of waveforms representative of operating conditions in various parts of the system illustrated in FIG. 6.

The coincidence circuit 70 may, for example, be of the type shown in FIGURE 7 which includes clippers 48, 49, 50 and 51, combining circuit 54 and clipper 60. To the clippers 48, 49, 50 and 51 are applied the clamped output waves of the matrixes having waveforms A, B, C and D as shown in FIG. 8. These clippers differ from the one shown in FIG. 1 inasmuch as they are designed to clip at both an upper and lower amplitude level. They may consist of amplifiers which are normally biased to cutoff, the cutoff level being approximately as shown by the level 52 in FIG. 8. Portions of waveforms A, B, C and D lying above level 52 are positive; those lying below are negative. When the portions above level 52 are applied to the clippers 48, 49, 50 and 51 they draw current, but when their positive amplitude exceeds a certain level indicated by the broken line 53 the amplifier tube reaches its plate-current saturation point. Thus, when the clamped signals from the matrixes are applied to the clippers, the latter will produce output signals having the waveforms E, F, G, and H (FIG. 8) which all have the same amplitude ranges. The factors involved in choosing the clipping level for waves A, B, C and D to be at level 53 will be explained below.

The upper clipping level 53 shown in waveforms A, B, C and D of FIG. 8 should be set as close to the level 52 as is practicable in order to minimize the possibility of the production of output signals by the clipper 60 when the input R, G and B signals do not correspond to colors which are to be modified. This may occur if the signals having the waveforms A, B, C and D have relative values such as shown at the instant of time indicated by the vertical broken line 67 drawn through them. If the clipping level 53 is too high, the large amplitude of waveform A will more than offset the negative signal of waveform C. Thus, the addition of the clipped waves A, B, C and D at that instant in the combining circuit 54 may produce a positive wave having an amplitude which exceeds level 58 as shown in waveform J and this excess will be clipped off by clipper 60 for use as a correction signal when, in fact, it is not. By making the difference between the upper and lower clipping levels very small, no single one or combination of the signal waves A, B, C and D can reach such a positive amplitude that another of the signal waves which is negative will be effectively cancelled thereby.

The output signals of the clippers are then applied to a conventional combining circuit 54 where they are added to one another to produce a signal having the waveform J (FIG. 8). The combining circuit 54 may comprise a resistive adding network, for example. Ordinarily the waveform J will not have an amplitude exceeding level 58 unless all of the clippers 48, 49, 50 and 51 produce some positive output signal simultaneously, a condition which will occur only when the original unmodified R, G and B signals represent colors to be modified.

The output signals of the clippers are then applied to a clipper 60 which is so set that only those portions of the signal applied thereto which lie above a certain amplitude level as, for example, above the level 58 (J, FIG. 8) will appear in its output circuit. When the signals applied to clipper 60 do exceed level 58, the output signals of the clipper 60 will have the waveform K of FIG. 8. The latter signal wave indicates when the R, G and B signals correspond to colors to be modified.

Referring again to FIG. 6, the output signal of clipper 60 can be used as the correcting signal itself so that it can be added to desired ones of the R, G and B signals in combining circuits 64, 65 and 66 to modify the colors of selected image elements in the desired fashion. Variable gain amplifier circuits 61, 62 and 63 may be provided intermediate coincidence circuit 70 and the combining circuits 64, 65 and 66 to permit adjustment of the amplitude of the correction signal.

Some remarks should be made concerning the setting of the level at which clipper of circuit 70 will operate. Where the colors which are scanned in any single line exhibit gradual changes rather than abrupt transitions from one color to the next, the clipping level of the clipper of circuit 70 should not be set too low, otherwise uniform amounts of the correction voltage from coincidence circuit 70 will be added to the color representative signals regardless of the fact that the color representative signals may represent different colors within the selected volume. When the same amount of corrective voltage is always added, it is not possible to apply more correction where more is needed and less where less is needed so that the reproduced image will show, instead of gradual transitions, sharp color boundaries and hence will not really be as faithful to the original as is desirable.

Figures 9, 10:
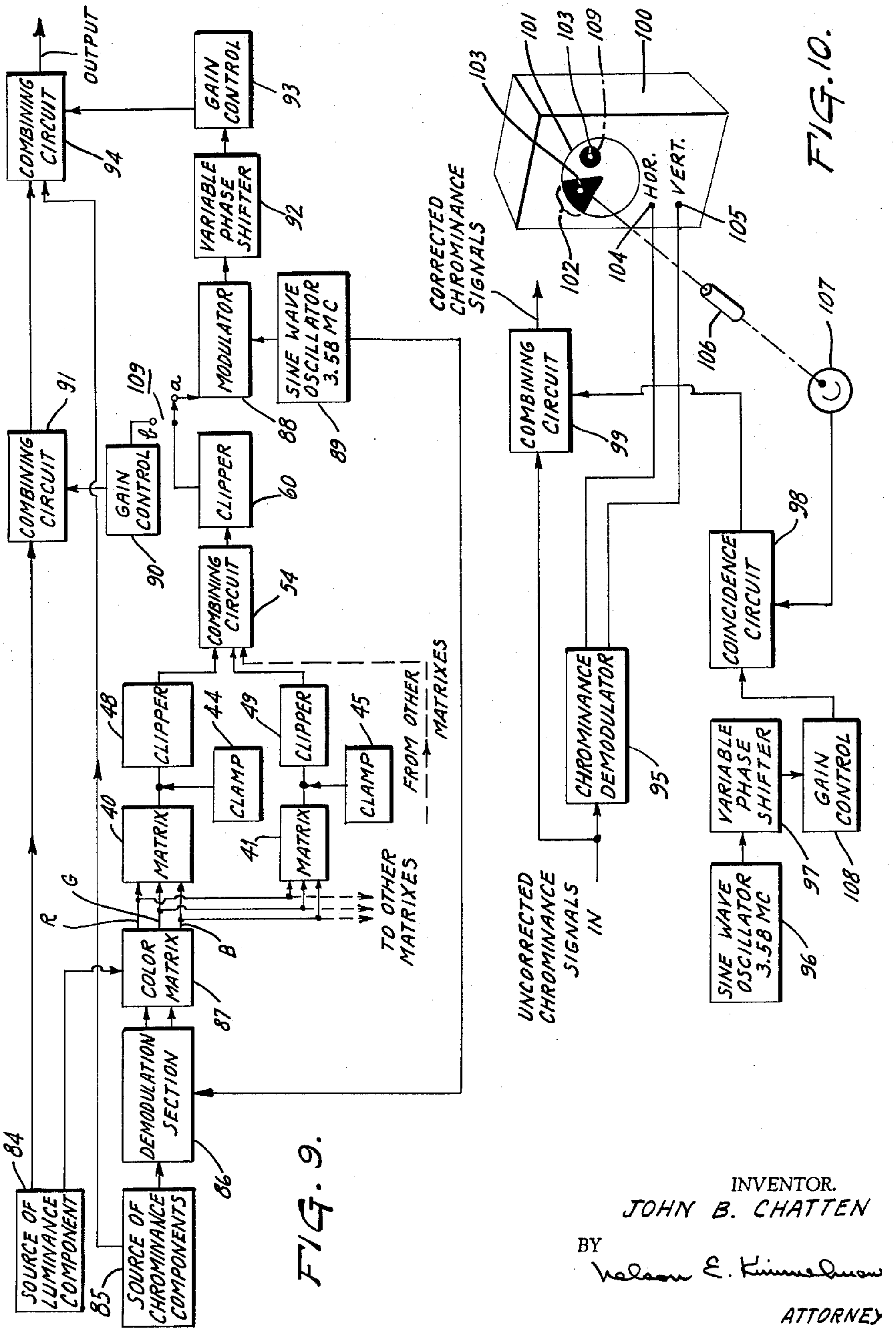
FIGURE 9 is a block diagram of a third form of my invention.
FIGURE 10 is a block and schematic diagram of still another form of apparatus for detecting the occurrence of preselected colors only.

FIGURE 9 illustrates another form that the present invention may take. Previous forms of the invention dealt with apparatus for altering color television signals as they exist before being used to modulate the color subcarrier. However, the necessary correction can alternatively be introduced even after the chrominance signals have been used to modulate the several phases of the color subcarrier. This arises from the fact that the phase of the subcarrier at any given time is indicative of a particular hue whereas its amplitude at that time indicates the saturation characteristic. Consequently, it is possible to change the hue and the saturation represented by the modulated color subcarrier at any given time by combining with it a wave having the same frequency as the color subcarrier but a different phase. The amplitude of the latter wave may also be controlled so that the combination of the modulated subcarrier and the added sine wave component produces a wave having a predetermined resultant amplitude and phase. The resultant wave, of course, has its own hue and saturation characteristics corresponding to the desired color correction.

In FIGURE 9 certain of the elements bear numbers identical to the ones in FIGURE 6 and, being equivalent for all practical purposes, will not be explained further. In order to modify the camera-generated chrominance components by combining a differently phased wave therewith the apparatus of FIG. 9 is designed to demodulate the camera-produced waves first so as to obtain the R, G and B signals for application to matrixes in accordance with the forms of the invention previously described.

A source 85 of chrominance components, which may be, for example, a conventional bandpass filter coupled to the television camera circuit, supplies the chrominance components to a conventional demodulation section 86. The demodulation section may consist of two synchronous detectors to which the chrominance components, in the proper quadrature phase relation, are applied. Assuming the original signals produced by the camera and its associated circuits conform to FCC standards the output waves of the two demodulators will consist of the so-called I and Q signals respectively. They are fed, together with a portion of the luminance components from source 84, which may also be the television camera circuits, to a color matrix 87 of the type common in conventional color television receivers, which intermixes them in the proper proportions and with the correct polarity to produce an output wave consisting essentially of three voltage waves respectively representative of the red, green and blue components of the televised object. These waves are applied to one or more matrixes such as matrix 40 which performs the same function as matrix 40 of FIGURE 6. To avoid needless repetition only two matrixes 40 and 41 are shown, it being understood that as many matrixes and their associated clamps and clippers are required as there are boundaries (excluding faces of the color cube) of the volume enclosing the plots of desired colors within the color space. Clamps 44 and 45, clippers 48 and 49, combining circuit 54, and clipper circuit 60 all have been described above in connection with FIGURE 6. As a result of their operation, whenever the red, green and blue signals in the output of color matrix 87 have values which correspond to points within the predetermined region in color space, the clipper 60 produces an output signal. When the arm of switch 109 is in contact position *a*, a portion of the output signal is applied to a modulator 88 which is preferably of the conventional doubly balanced type. A wave having the same frequency as the color subcarrier, i.e., 3.58 mc., is also supplied to modulator 88 from oscillator 89. In the absence of output signals from clipper 60 there will be no output from modulator 88, but when output signals are produced therefrom, a portion of the sine wave generated by oscillator 89 is applied to a variable phase shifter 92. The phase shifter 92 may be of any conventional type, e.g., one of those described beginning at page 949 of "Radio Engineer's Handbook" by F. E. Terman (first edition, McGraw-Hill, 1943). The operator can adjust the variable phase shifter 92 until the desired phase is obtained. The operator can also control the amplitude of the signal applied to a combining circuit 94 by adjusting gain control 93 located between the shifter 92 and the circuit 94. The uncorrected chrominance components from source 85 are also directly applied to the combining circuit 94 where the 3.58 mc. wave from gain control 93 will combine with the incoming phase and amplitude modulated color subcarrier from source 85 to produce a new resultant output wave whose phase and amplitude correspond to a particular desired color or range of colors.

It should be appreciated that in some cases, instead of I and Q signals appearing at the output of demodulation section 86, so-called "color difference" signals may appear there. This may mean that R–Y and B–Y signals have been used to modulate the quadrature phases of the subcarrier at the transmitter as was the case in an earlier system of color television. This earlier system is described in the February 1952 issue of "Electronics" beginning at page 90. In this event, the color matrix 87 will be such as to produce the primary color representative voltage waves from the R–Y and B–Y signals applied to it. Except for the different composition of the color matrix 87 the structure will be the same. Even if I and Q signals have been used to modulate the quadrature phases of the subcarrier at the transmitter, they may nonetheless be converted into R–Y, B–Y and G–Y signals by appropriate matrixing at the receiver. Regardless of the particular type of signal demodulated at the receiver, however, the operation of this form of the invention beginning with the output of the color matrix 87 is substantially the same.

An alternative method of operating the apparatus is to apply the output signal of clipper 60 directly to modify the amplitude of the luminance signal whenever the input signals correspond to a particular color, or a selected range of colors by moving the arm of switch 109 into position *b*. In that position the output signals from the clipper 60 will be applied to a conventional gain control 90 which may be suitably manipulated by an operator to adjust the amplitude of the signal to be applied to one input of the combining circuit 91. To another input of circuit 91, the luminance component from a source 84 are applied. Thus, whenever the color subcarrier components represent particular colors within a predetermined volume of color space, the gain control 90 may be set so as either to increase or decrease the amplitude of the output signal thereby increasing or decreasing the brightness of those colors as the case may be.

This system for altering the brightness of particular colors can also be used to produce special effects. For example, let us suppose that a "commercial" advertisement consisting of the lettered name of a product or sponsor is printed in red on a neutral gray background and is scanned by a color television camera. If the clipper 60 is connected to the switch 109 in the *b* position intermittently, as by an interrupting device (not shown), the red lettering will increase and decrease in brightness at the same rate. The accentuation of any other desired portion of the commercial, or any other part of the televised program may be similarly accomplished providing that the portion to be accentuated is keyed or coded by means of a distinguishing color or set of colors for which the matrixes 40, 41, etc., are set up. The luminance signal as modified may then be used in a variety of ways, for example, it may be recombined with the color subcarrier components in the combining circuit 94 and used in conventional fashion to modulate the main RF carrier in the transmitter.

While the invention has been described in terms of volumes of color space which have tetrahedron or pentahedron form, it should be appreciated that many other forms are possible. An example of another geometric form that can be used is a parallelepiped such as a cube. The cube would be bounded by six intersecting planes consisting of three pairs of parallel planes. Since each of these planes is definable in terms of one equation, a plurality of matrix units would be required to produce voltage waves corresponding to the equations. Corresponding clippers would select the top and bottom clipping levels in a manner similar to the clipping of the matrix signals as explained in connection with the apparatus shown in FIGS. 6 and 7. The operation of the apparatus after the clipping operation would be much the same as explained in connection with FIGS. 6 and 7. Still other preselected volumes of color space may be used such as volumes having one or more curved surfaces which would require corresponding matrixes.

The forms of the invention explained thus far have all applied the correction voltage wave only when the input television signals represent colors which may be plotted within the desired volume of color space. However, it is also possible to do just the opposite, i.e., apply the correction signals continuously *except when* the input signals represent colors falling *within* the predetermined volume. This may be accomplished in the system shown in FIG. 9, for example, by deriving negative output signals from the clipping circuit 60 and applying them to cut off an amplifier to which correction voltages, derived from an appropriate matrix unit as explained in connection with the previous figures, or from an appropriately phased sine wave, would be applied continuously. Thus no correction voltages would be applied when the input signals represented colors which could be plotted within the predetermined volume.

It should also be appreciated that the instant invention can be applied to color television receivers as well as to transmitters. For example, adjustable matrixes could be incorporated so that when signals corresponding to certain colors occurred, they would be detected in the manner previously explained and be used to trigger the application of a correction signal which could either be added to the color representative signals after they are demodulated from the subcarrier or added, in the form of a sine wave (similar to the operation of apparatus of FIG. 9), to the subcarrier components before demodulation thereof.

Also, a number of different forms of volumes may be predetermined and the operator can select the one which includes plots of colors which are to be corrected by appropriate switching means. It would then be possible to preset the amounts of the correction signals introduced by the variable gain amplifiers 61, 62 and 63 as shown in FIG. 6 so that colors within different ones of the volumes of color space would be modified by different correction signals.

It is even feasible to employ the present system to correct colors not within a volume of color space, but rather at a point or points substantially on a given plane therein. Techniques similar to those used in connection with the apparatus shown in FIGURE 6 are employed. However, they would be modified to the extent that the plane in which the desired colors lie may be considered as a very thin parallelepiped. Therefore, the space between the clipping levels of the set of top and bottom clippers would be very narrow.

FIGURE 10 shows another apparatus for detecting the scanning of particular colors within the televised object. Let us assume that the combined chrominance signals of color television signals are available. A portion of the input chrominance signals is applied to a chominance demodulator 95 which may be of any conventional form such as two conventional synchronous demodulators. The output of the demodulator 95 will consist of two distinct waves representative of the intelligence which modulates the quadrature phases of a subcarrier as transmitted by the color television transmitter in accordance with FCC approved standards. Thus, they may be either of the I and Q, or of the R–Y and B–Y types. Either of these two sets of waves may be fed to the input terminals 104 and 105 of the horizontal and vertical deflection circuits of a special vector display apparatus 100 which utilizes a cathode ray tube to produce a visible representation of the instantaneous phase and amplitude of the color subcarrier components. Since the horizontal and vertical deflection plates of the cathode ray tube are physically in quadrature relation, its electron beam will have a position determined by the resultant of the electric fields produced by the sets of respective deflection plates. An opaque mask 101 having a transparent segment 102 is placed in front of the faceplate of the cathode ray tube within the vector display apparatus 100. This mask 101 blocks the light output of the deflected spot 103 except when its position corresponds to a desired region of color space. An optical system 106, which is represented schematically, is so placed with respect to the vector display apparatus 100 that it projects light from the spot which passes through segment 102 upon a photosensitive device 107. Consequently the photosensitive apparatus 107 will produce a pulse whenever the uncorrected chrominance signal has a preselected phase. This pulse is applied to one input of coincidence circuit 98.

A sine wave oscillator 96 operating at 3.58 mc., the color subcarrier frequency, produces an output wave which is fed to a variable phase shifter 97. An operator can thereby adjust the phase of the wave from oscillator 96 so that when it is mixed with the uncorrected chrominance signals in the combining circuit 99, the latter circuit will produce corrected chrominance signals having the desired hue. A gain control 108 is inserted intermediate the phase shifter 97 and the coincidence circuit 98 to permit adjustments in the amplitude of the 3.58 mc. component that is to be added to the uncorrected chrominance signals. Of course, the gain control 108 may be inserted intermediate oscillator 96 and phase shifter 97 or any other convenient point. Whenever the pulse from the photosensitive apparatus 107 is applied to the coincidence circuit, therefore, a predetermined portion of the phase shifted 3.58 mc. sine wave from oscillator 96 will be applied to the combining circuit 99. To the other input of the combining circuit 99 the uncorrected input chrominance signals are also applied. At the output of the combining circuit 99 the corrected chrominance signals will appear which may then be applied to an appropriate utilization circuit (not shown). Both the phase and amplitude of the input chrominance signals may be altered in this fashion for a particular color or range of colors without affecting the chrominance signal for all other colors, since other colors cause the spot 103 to appear on portions of the faceplate masked off by the opaque mask 101.

Preferably the cathode ray tube included in the vector display apparatus 100 should have a fast decay phosphor in its screen structure. For example the zinc oxide phosphor known as "P15," may be used so that the light from the spot 103 does not linger after the chrominance signal has assumed new phase and amplitude characteristics. The photosensitive device 107 may be a photo-multiplier tube such as a type 931–A. If it is desired to correct more than one color, of course, it is evident that a plurality of systems, each like that shown in FIGURE 10 may be employed.

Further refinements may be introduced into the apparatus shown in FIGURE 10. Instead of having a wedge-shaped transparent segment 102 in the mask 101 a very small circular area 109 may be made transparent, the area 109 being displaced from the center, through which light from the spot 103 is to pass. The input signals to the horizontal and vertical deflection systems 104 and 105 are "normalized," i.e., the luminance signal amplitude may be divided into the amplitude of the chrominance signals which are applied to the chrominance demodulator 95. This is done to prevent brightness changes from causing the spot 103 to move toward or away from the center of the faceplate so that if the input signals have the selected hue and saturation, the spot will fall within the area 109. If the mask is rotated about its axis so that the area 109 is placed to indicated the occurrence of a different color, brightness changes in the latter will not interfere with the appearance of the beam spot 103 in the newly-positioned area 109.

While the instant invention has been explained primarily in terms of color television applications it should be borne in mind that it would be of great use in other fields such as radar. Let us assume that a radar antenna is so controlled, by servo-mechanisms, for example, that it always points at or "tracks" the objects. This scanning antenna may be used to derive three signals that are continuously proportional to the $x$, $y$ and $z$ coordinates of the position of the object. These three signals may be used to identify the instantaneous position of the object in a rectangular, three dimensional coordinate system such as has been described above in connection with color space. Similarly, when the object comes into a predetermined position in the three dimensional coordinate system an appropriate countermeasure device may be actuated.

A signal proportional to range may be obtained as follows: As each pulse is transmitted a flip-flop circuit is actuated which begins to generate a rectangular pulse. If there is any echo from the transmitted pulse the flip-flop circuit is turned off and thus the width of the pulse is a function of the range. These variable width pulses are passed through a low-pass filter which has a cut-off point just below the repetition rate of the transmitted pulses. The filtered range signal is then passed through a "tapered" potentiometer system which is coupled to the scanning antenna. These tapered potentiometers are so constructed that the density of the carbon is deposited therein in a non-linear fashion, i.e., according to a sinusodial or cosinusoidal function of the rotational angle of the wiper shaft.

Assuming that angle A represents azimuth and angle B represents elevation, the potentiometers are so constructed that their instantaneous resistance values will vary as functions of these respective variables. Thus, when the range signal $r$ is applied through each of them, respective signals will be produced by the potentiometers which will correspond to the following equations:

$$x=r\cos B\cos A$$
$$y=r\cos B\sin A$$
$$z=r\sin B$$

These three signals may be considered as analogous to the input voltage waves representative of the red, green, and blue components of the televised image. Since they have been derived for use with a type of space similar to color space the $x$, $y$ and $z$ signals may then be applied to matrixes similar to matrixes 40 through 43 of FIGURE 6 to produce an output signal representing the traversal by the object being tracked of the "forbidden" zone. When this occurs, appropriate countermeasure or alarm devices may automatically be actuated, for example.

Having thus described the invention what is claimed is:

1. In a color television system which includes respective sources of first, second, and third time-variable, primary color representative signals, a system for improving color fidelity by selectively modifying said first, second, and third signals only when said signals are representative of a preselected portion of the colorimetric hue and saturation range reproducible by addition of said primary colors, comprising:

(a) a plurality of matrix circuits each responsive to said first, second, and third signals for providing an output signal proportional to $$kr+mb+ng$$

where $k$, $m$, and $n$ are constants, at least one of which is different from the other two, there being a different set of constants $k$, $m$, and $n$ for each matrix circuit, and where $r$, $g$, and $b$ are the instantaneous amplitudes of said first, second, and third signals, respectively;

(b) a plurality of signal cilpping means, each connected to an output of a respective one of said matrix circuits and arranged to pass the output of its associated matrix circuit when said output differs in a selected sense from a preselected value;

(c) coincidence circuit means responsive to the output signals of said plurality of signal clipping means; and (d) signal modifying means responsive to the output of said coincidence means for modifying at least one of said primary color representative signals.

2. The system of claim 1 wherein the output of said coincidence circuit means is connected to three variable gain amplifiers, and the respective outputs of said three amplifiers are connected to said signal modifying means, said signal modifying means comprising three combining circuits for additively combining the outputs of said three variable gain amplifiers with said respective primary color representative signals.

3. In combination:

(a) first, second, and third time-variable primary color representative signals;

(b) means responsive to said first, second, and third signals for providing a resultant signal when a preselected colorimetric hue and saturation range is represented by addition of said first, second, and third signals, said means comprising (1) a matrix unit including means for selectively inverting said first, second, and third signals, and means for additively combining predetermined portions of the three output signals from said last-named means, thereby to provide a bipolar output signal proportional to the quantity:

$$kr+mb+ng$$

where $k$, $m$, and $n$ are constants, and $r$, $b$, and $g$ are the instantaneous amplitudes of said first, second, and third signals, respectively, the polarity of said output signal corresponding to the sign of said quantity, and (2) a clipper responsive to said bipolar output signal for eliminating one particular polarity thereof; and (c) means for adding to each of said first, second, and third signals respective preselected fractions, within the range from zero and one, of said resultant signal.

4. The combination of claim 3 wherein said means for selectively inverting comprising three phase inverters, each having an input and an output terminal, said first, second, and third signals being coupled to the respective input terminals of said inverters, and three switches arranged to connect individually either the input or output terminals of said three phase inverters to three further terminals, respectively; and wherein said means for additively combining comprises three potentiometers, one end terminal of each being connected to reference potential, the other end terminals of said potentiometers being connected to said three further terminals, respectively, and a voltage adder having three input terminals connected to the respective adjustable contact arms of said potentiometers.

References Cited by the Examiner

UNITED STATES PATENTS

| | | | |
|---|---|---|---|
| 2,981,792 | 8/1961 | Farber | 178—5.2 |
| 2,987,571 | 6/1961 | Allen et al. | 178—5.2 |

DAVID G. REDINBAUGH, *Primary Examiner.*

J. A. O'BRIEN, *Assistant Examiner.*